3,736,099
Patented May 29, 1973

3,736,099
PIPETTING DEVICE
Geoffrey S. Begg, Heidelberg, Victoria, Australia, and Nils Bertil Jacobson, Solna, Sweden, assignors to Medinova AB, Solna, Sweden
Filed Apr. 21, 1971, Ser. No. 135,989
Claims priority, application Sweden, Apr. 27, 1970, 5,756/70
Int. Cl. G01n 1/10, 1/12
U.S. Cl. 23—259                14 Claims

ABSTRACT OF THE DISCLOSURE

Pipetting device, in which a disposable plastic tube supplied from a store roll is used as a pipette. A portion of the plastic tube extends through an elongate, cylindrical chamber having a tube-shaped elastic wall surounding the plastic tube. This chamber is filled with liquid and communicates with a compressible bellow also filled with liquid. By compression of the bellow it is possible to compress the portion of the plastic tube surrounded by the liquid-filled chamber and thus to vary the internal volume of said portion of the plastic tube. This variation of the internal volume of the plastic tube is used for sucking up a predetermined liquid volume to be pipetted into the plastic tube and subsequently discharging this pipetted liquid volume from the plastic tube into another vessel. After each pipetting operation the used section of the plastic tube can be cut off and a new unused section of plastic tube be supplied from the store roll.

---

The present invention is related to a pipetting device.

Pipetting, i.e. the transfer of a predetermined liquid volume from one vessel to another vessel, is one of the most frequent operations in laboratorial work. Thus, practically all quantitative analyses in chemistry and biology require that predetermined selected volumes of liquid, as for instance the sample to be tested or a reagent, can be measured accurately and transferred from one vessel to another vessel. The pipetting process requires that any selected volume of liquid can be measured very accurately and transferred from one vessel to another vessel without any risk of contamination or dilution of the pipetted liquid volume.

Various pipetting devices are known in the art. The most common device consists of a straight pipe of glass or any other rigid and transparent material, which has its one end extended to a thin tip and which is provided with a visible graduation indicating the internal volume of the pipe as measured from its tip. By suction in the opposite end of the pipe a selected liquid volume can be collected into the pipe, the pipetted liquid volume being determined by reading the graduation opposite to the liquid meniscus in the pipe. This method has the advantage that any selected volume can easily be pipetted and that the necessary pipetting device is very simple and cheap. However, the process is time-consuming and reading errors when reading the graduation on the pipette are not uncommon. Further the cleaning and drying of used pipettes is a time and work consuming procedure, which often makes it necessary to have a large number of pipettes. Disposable pipettes which are intended to be used only once and then discarded are also known in the art. These disposable pipettes have the disadvantage that the costs for the pipettes become rather high, as the pipettes must be manufactured with a high precision, as the tolerances in their dimensions will determine the accuracy of the liquid volumes being pipetted. Automatically operating pipetting devices are also known in the art. A common pipetting device of this type comprises a disposable pipette of rigid plastic, which can be inserted in a device, by means of which a vacuum can be produced in the pipette for sucking up the liquid volume to be pipetted and subsequently an over-pressure for discharging the pipetted liquid volume. It is also known in the art to pipette liquids by means of a peristaltic pump and a flexible plastic tube. Also in these prior art devices it is necessary that the components in which the pipetted liquid volumes are measured, that is the disposable pipettes of the plastic tubes respectively, are manufactured with a precision corresponding to the required accuracy of the pipetting process. Further, the exchange of the disposable pipettes or the plastic tubes respectively in these prior art devices requires manual operations which is a disadvantage. Therefore, other automatically operating pipetting devices have been suggested, in which the components which come in contact with the pipetted liquid are washed between successive pipetting operations. This method has the disadvantage, however, that the risk of contamination between successive pipetted liquid volumes can never be completely avoided.

The object of the present invention is therefore to provide an improved pipetting device, in which the above discussed disadvantages of prior art pipetting devices are eliminated.

The pipetting device according to the invention comprises a tube of elastic material, a tubular sleeve with a variable diameter enclosing said tube over a portion of its length for variation of the internal volume of the portion of the tube enclosed by said sleeve by compression of the tube to a variable extent, said tube extending outside said sleeve at both ends of the sleeve, means for variation of the diameter of said sleeve, means for determining the variation of the internal volume of said tube caused by said variation of the diameter of said sleeve, and means for closing said tube adjacent the one end of said tubular sleeve.

In a preferred embodiment of the invention the pipetting device comprises a liquid-filled chamber, which is provided with a tubular passage with an elastic wall extending through the liquid-filled chamber and having open opposite axial ends, through which passage the tube extends so as to be enclosed by said elastic wall of said passage, whereby the said elastic wall of said pasage forms said sleeve with variable diameter, means for transferring liquid alternatively to and from said liquid-filled chamber for variation of the internal diameter of said tubular passage and means for determining the liquid volume being transferred respectively to and from said liquid chamber.

The pipetting device according to the invention has the advantage that any ordinary tube of elastic material, as for instance a conventional plastic tube, can be used, as the dimensianal tolerances of the tube being used do not in any way influence the accuracy of the pipetting process, which is determined only by the precision of the means used for compressing the plastic tube and for determining the variations in the internal volume of the tube caused by the compression of the tube. Therefore, in a pipetting device according to the invention it is economically feasible to discard the used tube after each pipetting, whereby every risk of contamination or dilution between successive pipetted liquids is completely eliminated.

In a preferred embodiment of the invention the tube is stored on a store roll, from which the tube extends through the tubular passage in the liquid-filled chamber so as to have its open fore end projecting with a suitable length from one end of the tubular passage in the liquid-filled chamber so that the open end of the tube can be immersed into the liquid to be pipetted. After a pipetting process the used section of the tube, i.e. the secion of the tube that has come into contact with the pipetted liquid, is cut off by cutting means provided adjacent said end of the tubular passage in the liquid-filled chamber, whereafter a new unused section of the tube is wound off from the store roll by means of feed rollers engaging the tube.

The pipetted liquid volume can be selected and accurately controlled, as it corresponds exactly to the liquid volumes being transferred respectively to and from the liquid-filled chamber.

The pipetting device according to the invention can be manually operated, but can also readily be adopted for automatic operation and remote control, whereby it can be used in places not accessible to personnel, e.g. due to radioactivity.

In the following the invention will be further described with reference to the accompanying drawing, which illustrates by way of example some embodiments of the invention. In the drawing FIG. 1 shows schematically in elevation and partially in section a pipetting device according to the invention;

FIG. 2 is a time function diagram illustrating the operating cycle of the pipetting device shown in FIG. 1;

FIGS. $2t_1$ to $2t_5$ illustrate schematically different stages of the operating cycle of the pipetting device shown in FIG. 1;

Figure 1:
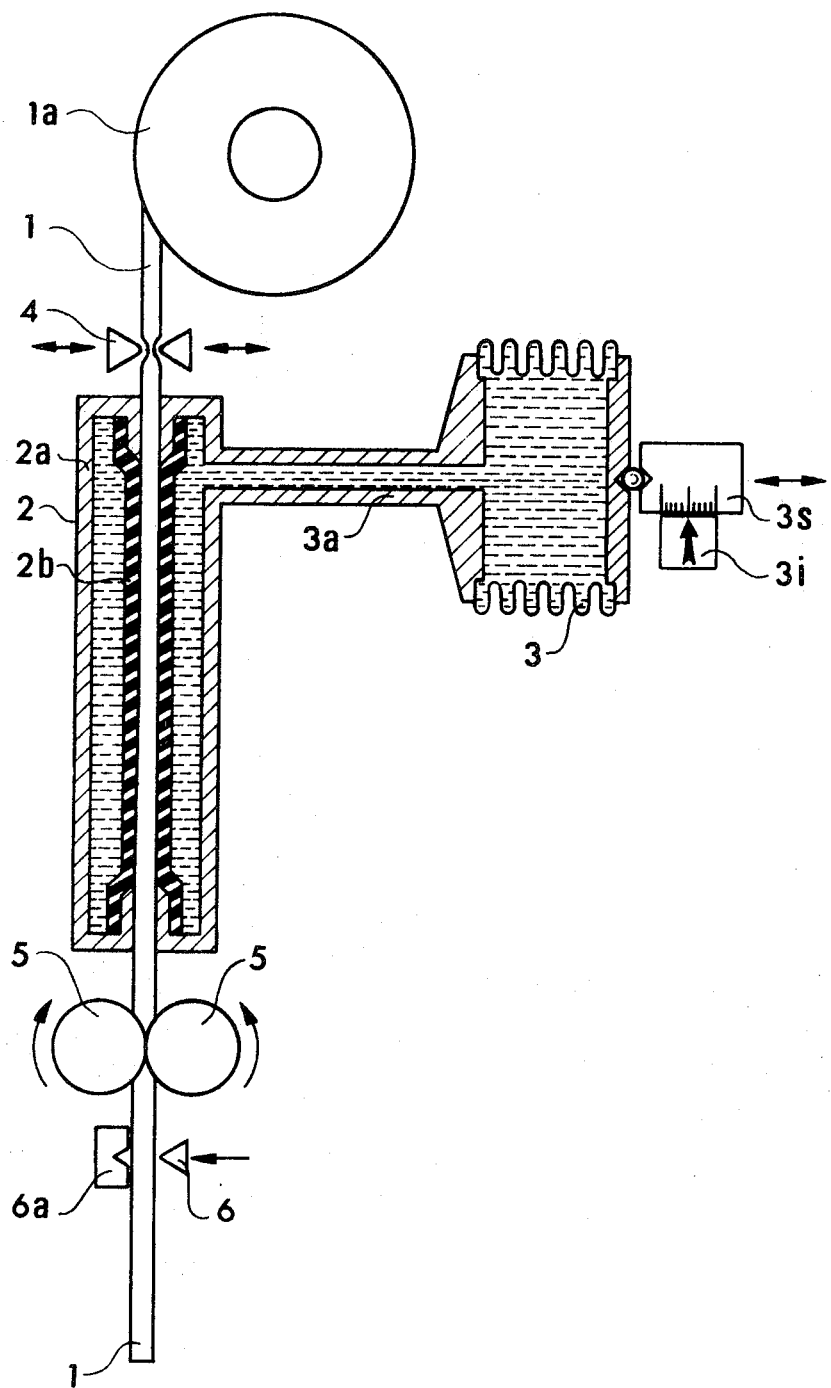

The pipetting device according to the invention illustrated by way of example in FIG. 1 comprises a tube 1 of elastic material, as for instance an ordinary plastic tube. The tube is supplied from a store roll 1a, which can hold a substantial length of tube. From this store roll 1a the tube 1 passes through a tube clamp 4, by means of which the tube can be shut off in conventional manner, and thereafter through a tubular passage or duct extending through a liquid-filled chamber 2. The elongate cylindrical chamber 2 consists of an outer rigid tube 2a, opposite rigid end walls and an inner elastic tube 2b, which constitutes the wall of the tubular passage through the liquid-filled chamber 2 and which consequently surrounds the plastic tube 1. Outside the opposite or lower end of the chamber 2 the tube 1 passes between two rotatable feed rollers 5, which embrace and engage the tube without completely compressing it, and a cutting device consisting of a stationary cutting block 6a and a movable knife 6. The chamber 2 communicates through a pipe 3a with a compressible bellow 3 having a rigid, axially displaceable end wall. The chamber 2, the pipe 3a and the bellow 3 are completely filled with a liquid, as for instance hydraulic oil, from which all gas bubbles have been carefully removed. When the hollow 3 is compressed so that its internal volume decreases, liquid will be transferred from the bellow 3 into the chamber 2, whereby the internal volume of the chamber 2 increases by the same amount as the internal volume of the bellows 3 decreases, at the same time as the elastic tube 2b compresses the plastic tube 1. It is appreciated that the internal volume of the portion of the plastic tube 1 enclosed by the liquid-filled chamber 2 will decrease by exactly the same amount as the internal volume of the bellow 3. Of course, exactly the opposite process will take place, when the bellow 3 is expanded, whereby its internal volume is increased and liquid is transferred from the chamber 2 into the bellow 3 so that the compression of the plastic tube 1 is reduced and the internal volume of the portion of the plastic tube 1 enclosed by the chamber 2 increases by exactly the same amount as the internal volume of the bellow 3. The compression of the bellow 3 can be determined by the aid of a scale 3s attached to the displaceable end wall of the bellow 3 and a read-off indicator 3i. The scale 3s may preferably be graduated in units of volume, as for instance in tenths or hundredths of one millilitre.

The operation of the pipetting device illustrated in FIG. 1 will now be described with reference to FIGS. $2t_1$ to $2t_5$, which schematically illustrate successive stages of an operating cycle for the pipetting device, and the diagram in FIG. 2. In the diagram in FIG. 2 the curves $1_v$, $2_v$ and $3_v$ respectively illustrate the variations of the internal volumes of the plastic tube 1, the chamber 2 and the bellow 3 respectively. The curves $4_t$, $5_t$ and $6_t$ respectively illustrate the state of operation of the tube clamp 4, the feed rollers 5 and the cutting knife 6 respectively, the higher level of any one of these curves indicating that the associated device is activated, whereas the lower level of any one of these curves illustrates that the associated device is in an inactive state.

During the first stage $t_1$ of the operating or pipetting cycle the bellow 3 is maximally expanded, wherefore the chamber 2 has its smallest internal volume and the elastic tube 2b does not press against the plastic tube 1, which is axially movable in the tubular passage through the chamber 2 formed by the elastic tube 2b. It is appreciated that at this stage the internal volume of the portion of the plastic tube 1 enclosed by the chamber 2 has also its maximum value. The tube clamp 4 is in its open position and does not shut off or clamp the tube 1, whereas the knife 6 is inactive. The feed rollers 5 are operating, however, so as to feed the plastic tube 1 from the store roll 1a (compare FIG. 1) through the chamber 2. When a suitable length of tube 1 is projecting underneath the cutting device 6, the feed rollers 5 are stopped and the tube clamp 4 is closed so as to close the plastic tube 1 hermetically above the chamber 2.

During the next stage $t_2$ of the operating cycle the bellow 3 is compressed to a predetermined well-defined starting position, whereby the internal volume of the chamber 2 increases and the elastic tube 2b compresses the plastic tube 1 to a well-defined starting position. Thereafter, the lower open end of the plastic tube 1 is immersed in the liquid 9 from which a predetermined liquid volume is to be pipetted.

During the next stage $t_3$ of the operating cycle a predetermined selected liquid volume is sucked up into the plastic tube 1. This is achieved in that the bellow 3 is expanded by a volume equal to the selected liquid volume to be pipetted. As explained in the foregoing, the variation of the internal volume of the bellow 3 is transmitted exactly to an equally large increase of the internal volume of the portion of the plastic tube 1 enclosed by the chamber 2. As the plastic tube 1 is sealed by the closed tube clamp 4, a liquid volume exactly corresponding to the increased volume of the bellow 3 will be drawn up into the plastic tube 1. Thereafter, the pipetting device is raised so that the tube 1 is no longer immersed in the liquid 9.

During the next stage $t_4$ of the pipetting cycle the liquid volume in the tube 1 is to be emptied into another vessel 10. This is done by compression of the bellow 3 so that the plastic tube 1 is also compressed. In order to achieve a complete emptying of the plastic tube 1 it is preferable during this stage $t_4$ to compress the tube 1 to an internal volume which is smaller than the internal volume of the tube at the end of the stage $t_2$. Without this additional compression of the plastic tube 1 there exists always the risk that the last liquid drop will adhere to the lower end of the plastic tube 1 due to the surface tension of the liquid. By the additional compression of the plastic tube, however, it is made certain that the pipetted liquid volume in the plastic tube is completely emptied into the vessel 10.

After the emptying of the plastic tube 1 at the end of the stage $t_4$ the internal volume of the plastic pipe 1 is restored to the initial volume corresponding to the volume at the end of the stage $t_2$.

If the next pipetting is to be done from the same liquid 9 as the preceding, just completed pipetting, the operating cycle can after the stage $t_4$ be repeated from a starting position corresponding to the end of the stage $t_2$, that is with the same section of the tube 1 as used for the preceding pipetting process. In the diagram in FIG. 2 this is indicated with dotted arrows.

If on the contrary the next pipetting is to be done from another liquid than the preceding, just completed pipetting, the operating cycle of the device is continued with the stage $t_5$. During this stage the bellow 3 is expanded to its maximum volume so that the elastic tube 2b of the chamber 2 does not any more press against the plastic tube 1. Further, the tube clamp 4 is opened, so that the plastic tube 1 can be moved axially through the chamber 2. The feed rollers 5 are started to feed the plastic tube 1 from the supply roll 1a (compare FIG. 1) through the chamber 2 by a length corresponding at least to the section of the plastic tube 1 that has come into contact with the liquid during the preceding pipetting process. Thereafter, the feed rollers 5 are stopped and at the end of the stage $t_5$ the previously used section 1a of the plastic tube 1 is cut off by means of the knife 6. Thereafter, the operating cycle can be restarted for the next pipetting process with the stage $t_1$ in the manner described in the foregoing.

The pipetting device according to the invention can be manually operated but may also be provided with a control unit for automatic operation. FIG. 3 shows by way of example a pipetting device according to the invention adapted for automatic operation. In this pipetting device the bellow 3 is operated by a servomotor 3m through a gear and screw mechanism 3s. The servomotor 3m is controlled from a servo-amplifier 3d, which receives a reference voltage from a central control unit 7 and a feed-back voltage from a potentiometer 3c. The movable tap of the potentiometer 3c is mechanically coupled to the gear and screw mechanism 3s in such a manner that the voltage on the tap of the potentiometer 3c is proportional to the compression of the bellow 3 and thus inversely proportional to the internal volume of the plastic tube 1 enclosed by the chamber 2. From the central control unit 7 different reference voltages can be selectively connected to the servo-amplifier 3d. In the illustrated embodiment this is obtained by means of a voltage divider 8 having four different taps, which can be selectively connected to the servo-amplifier 3d through a selector switch. The voltage on the tap 8a of the voltage divider 8 has such a value that with this tap 8a connected through the selector switch to the servoamplifier 3d maximum compression of the tube 1 and thus minimum internal volume of the tube 1 is obtained (compare the curve $1_v$ stage $t_4$ in FIG. 2). The voltage on the tap 8b has such a value that with this tap connected through the selector switch to the amplifier 3d the plastic pipe 1 is compressed to have an internal volume corresponding to the starting position for the actual pipetting, that is the position at the end of the stage $t_2$ in FIG. 2. The voltage on the third tap 8c of the voltage divider 8 gives, when connected through the selector switch to the servo-amplifier 3d, a compression of the plastic tube 1 corresponding to the desired internal volume of the plastic tube at the end of stage $t_3$ in FIG. 2. Consequently, the voltage on the tap 8c determines the liquid volume to be pipetted. Therefore, the tap 8c is movable along the voltage divider 8 so that the pipetted liquid volume can be varied and preselected. The fourth tap 8d of the voltage divider 8 has such a voltage that, when supplied to the servo-amplifier 3d, the elastic tube 2b in the chamber 2 (compare FIG. 1) does not any more press against the plastic tube 1. This corresponds consequently to the end of the stage $t_5$ in FIG. 2.

Figure 2:
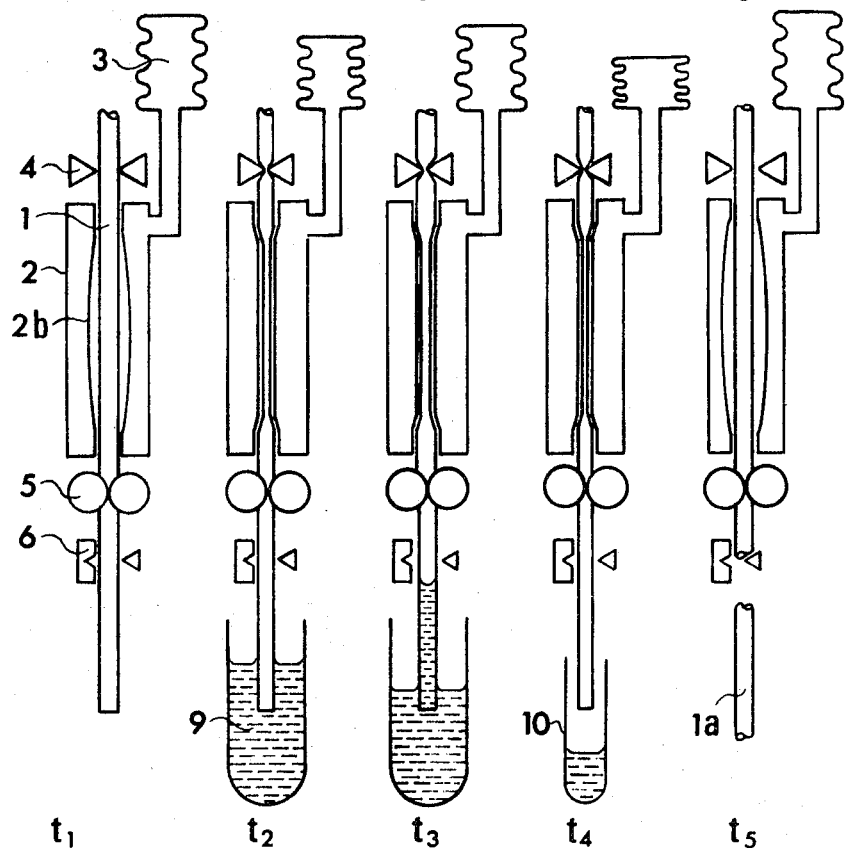
Figure 2:
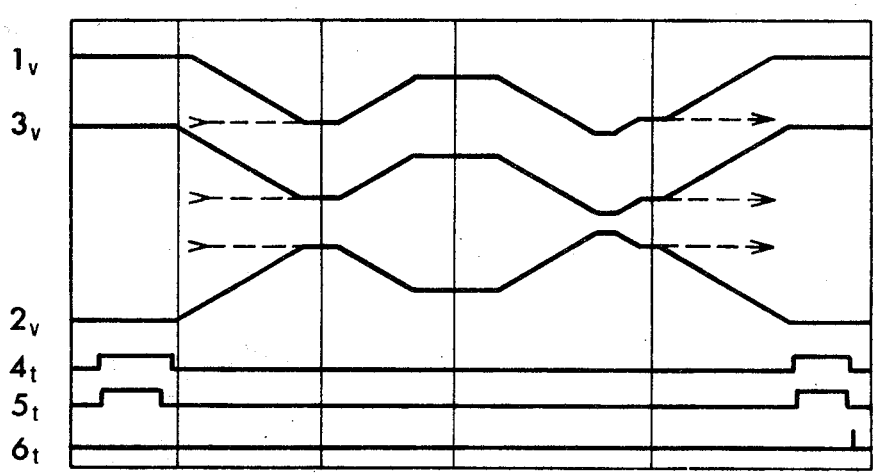
Figure 3:
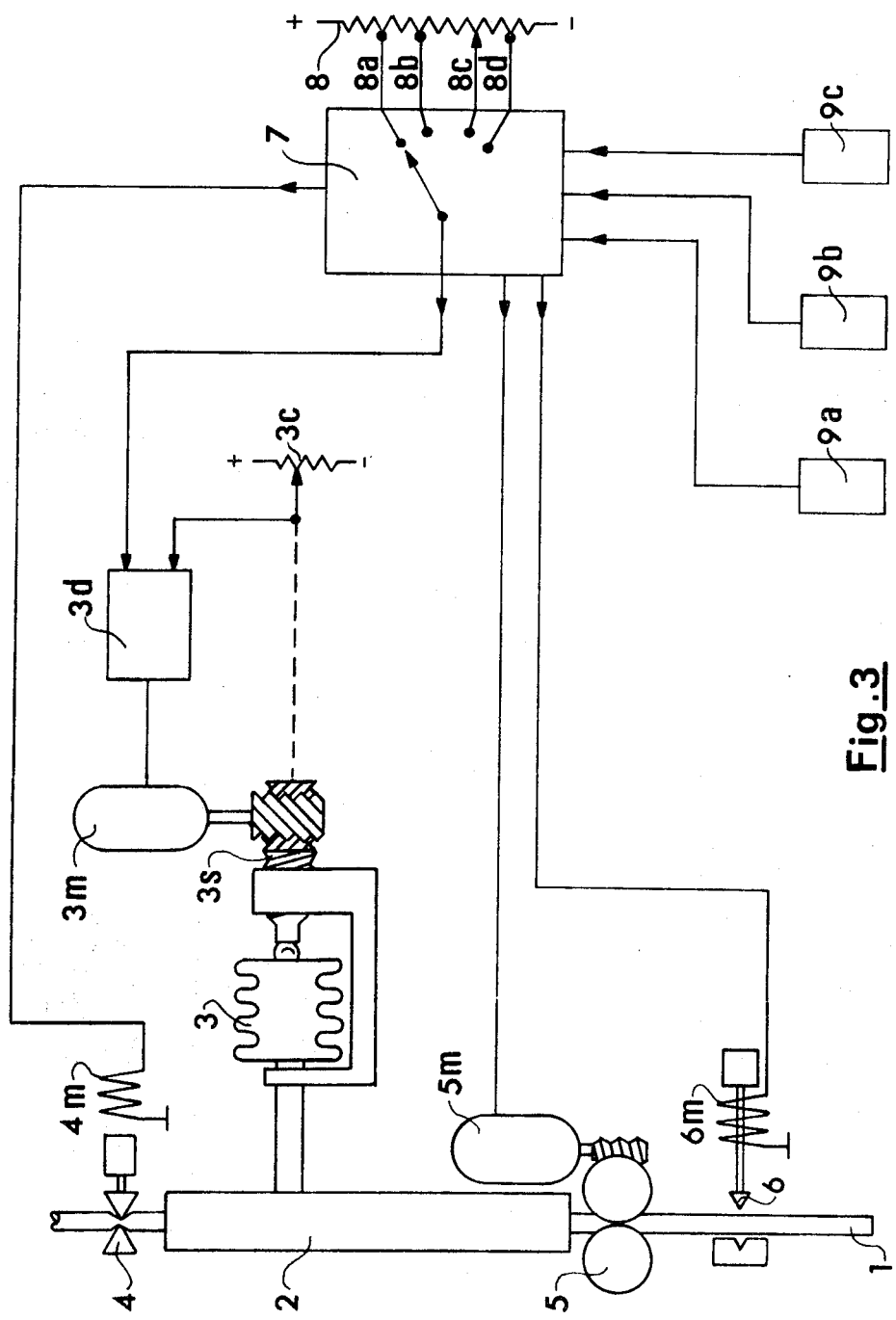
FIG. 3 is a block diagram of an electrical control unit for the pipetting device illustrated in FIG. 1.
Figure 4:
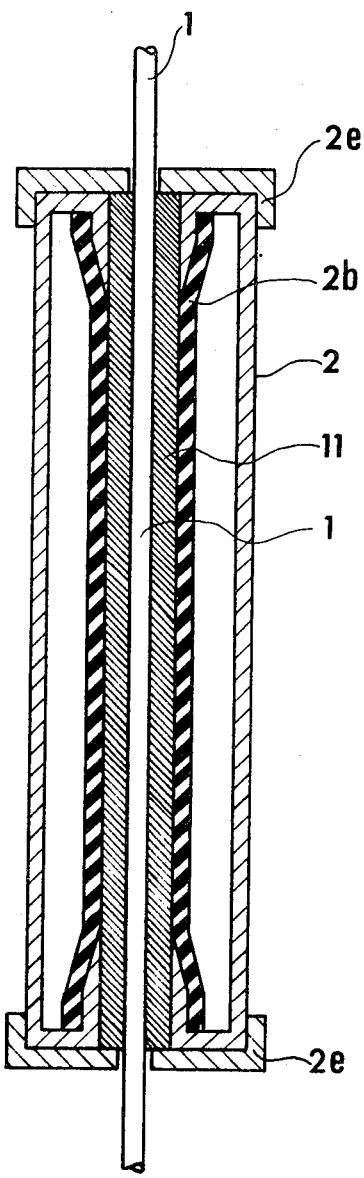
FIG. 4 shows in axial cross-section a modification of the liquid-filled chamber of the pipetting device shown in FIG. 1 when used together with a tube having a smaller diameter.

The control unit 7 controls also the energization of a solenoid 4m for the operation of the tube clamp 4, the energization of a solenoid 6m for the operation of the cutting knife 6 and the energization of a drive motor 5m for the feed rollers 5 in accordance with the predetermined program for the operating cycle of the pipetting device described in the foregoing in connection with FIG. 2 and FIGS. $2t_1$ to $2t_4$. The change-over from one stage to the next stage of the operating cycle illustrated in FIG. 2 can be controlled by means of manually operated push buttons on a keyboard or by means of foot-operated switches 9a, 9b and 9c.

Naturally, the central control unit 7 may be designed to operate in a still more sophisticated manner than described above. Thus, for instance, in order to keep the consumption of the plastic tube 1 as low as possible the feeding of the plastic tube 1 between successive pipetting processes may be controlled in response to the actually pipetted liquid volume during the last pipetting process, that is dependent on the voltage on the tap 8c during the last pipetting process. Further, the pipetted liquid volume may be determined in response to an external transducer, as for instance when the pipetting device according to the invention is used for automatic titrations.

The dimension, that is the diameter, of the plastic tube 1 used for the pipetting should preferably be selected so as to be suitable for the liquid volumes to be pipetted. In order to obtain that the changes of the internal volume of the bellow 3 are accurately transferred to equally large changes of the internal volume of the plastic tube 1, the external diameter of the plastic tube 1 shall preferably not deviate too much from the internal diameter of the elastic tube 2b in the chamber 2. Therefore, when using a plastic tube 1 having an external diameter substantially smaller than the internal diameter of the elastic tube 2b in the chamber 2, an elastic spacer sleeve 11 is disposed between the plastic tube 1 and the elastic tube 2b of the liquid-filled chamber 2, as schematically illustrated in FIG. 2. The spacer sleeve 11 is kept in position by end caps 2e attached to the ends of the liquid-filled chamber 2.

When pipetting sterile liquids or other liquids which cannot be permitted to become contaminated, the plastic tube 1 should not come into contact with any unsterile parts of the pipetting device. This can be achieved, if the plastic tube 1 is sterile in itself and provided over its entire length with an outer thin protective sheath, consisting for instance of a thin plastic film, which is torn off the plastic tube after the passage of the tube through the feed rollers 5 but before the cutting knife 6. In this way the cutting knife 6 is the only part of the pipetting device that must be kept sterile. For tearing off the protective sheath from the plastic tube 1 a roller or wheel can be used, which is disposed between the feed rollers 5 and the cutting knife 6 and which is rotated together with the feed rollers 5 and to which the protective sheath at the end of the plastic tube 1 is attached when the plastic tube 1 is inserted in the pipetting device for the first time. Thereafter, the protective sheath will be automatically torn off the plastic tube 1 as this is fed through the pipetting device by the feed rollers 5.

Figure 5:
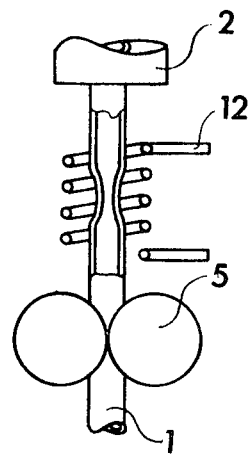
FIG. 5 illustrates schematically a device for heating a short section of the tube so that the heated section of the tube can be stretched to a smaller diameter and a thinner wall, whereafter the tube is cut off at said stretched section.
Figure 6:
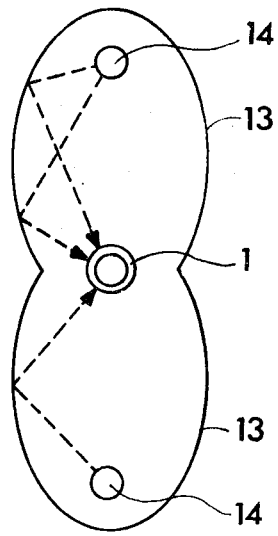
FIG. 6 illustrates schematically another device for heating a short section of the tube for the same purpose.

The most serious source of measuring errors in a pipetting device is generally the fact that when emptying the pipette small amounts of liquid adhere and remain on the tip of the pipette due to the surface tension of the liquid. In the pipetting device according to the invention this type of measuring errors is reduced to a very high extent in that the pipetted liquid is emptied by a forceful compression of the plastic tube 1. An additional improvement of the device in this respect can be obtained in that the plastic tube 1 is over its entire length externally as well as internally provided with a thin layer of a surface tension reducing agent, as for instance silicone. The effect of the surface tension of the liquid when emptying the plastic tube can be further reduced in that before the cutting of the plastic tube between two successive pipetting processes the section of the tube where the cutting is to take place is stretched to a smaller diameter and a thinner wall thickness. This stretching of the plastic tube 1 before the cutting thereof can be produced by means of the feed rollers 5 in that the tube clamp 4 is temporarily closed to hold the plastic tube 1 against the traction force of the feed rollers 5. Preferably the plastic tube is heated at the point where it is to be stretched. FIG. 5 illustrates schematically a device for heating the plastic tube 1 over a short section, at which it is to be stretched and subsequently cut. This heating device consists of a heating coil 12 surrounding the plastic tube 1. The coil 12 may be a resistive electric heating coil or a high frequency heating coil. FIG. 6 illustrates schematically another device for heating the plastic pipe 1 over a short section. This heating device consists of two elliptical mirrors 13 joined so as to have a common focus, in which the plastic tube 1 is located. In the other focus of each elliptical mirror 13 an electric heating element 14 is located, whereby the heat radiation from the heating elements is reflected by the elliptical mirrors 13 towards the plastic tube 1. The heating of the plastic tube 1 takes place in the stage $t_5$ of the operating cycle illustrated in FIG. 2 before the cutting of the tube by means of the knife 6. The heating process is preferably controlled by the control unit 7.

It is appreciated that various modifications of the pipetting devices according to the invention described in the foregoing are possible within the frame of the invention. Thus, for instance, instead of the compressible bellow 3 it should be possible to use a cylinder with a movable piston.

We claim:

1. A pipetting device comprising a tube of elastic material, a tubular sleeve with controllably variable diameter enclosing said tube over a portion of its length for variation on the internal volume of said portion of said tube by compression of the tube to a variable extent, said tube extending outside said tubular sleeve at both ends thereof, means for controllably varying the diameter of said tubular sleeve, means for determining the variations of the internal volume of said portion of said tube caused by said variation of the diameter of said tubular sleeve, and means for closing said tube adjacent one end of said tubular sleeve.

2. A pipetting device as claimed in claim 1, comprising a liquid-filled chamber having a tubular passage, which extends through said chamber and has open opposite axial ends and an elastic wall, said tube extending through said tubular passage so that said elastic wall of said passage surrounds said tube and forms said tubular sleeve with controllably variable diameter, means for transferring liquid selectively to and from said chamber, and means for determining the volume of liquid being transferred respectively to and from said chamber.

3. A pipetting device as claimed in claim 2, wherein said liquid-filled chamber communicates with a liquid-filled cylinder provided with a movable piston and means are provided for displacing said piston within said cylinder and for determining the magnitude of the displacement of said piston.

4. A pipetting device as claimed in claim 2, wherein said liquid-filled chamber communicates with a liquid-filled bellow-shaped compressible container and means for compressing said container and for determining the magnitude of the compression of said container.

5. A pipetting device as claimed in claim 1, wherein said means for closing said tube adjacent said one end of said tubular sleeve include a tube clamp.

6. A pipetting device as claimed in claim 1, comprising means for feeding said tube through said tubular sleeve towards the opposite end of said tubular sleeve.

7. A pipetting device as claimed in claim 6, wherein said feeding means include feed rollers engaging the portion of said tube projecting outside said opposite end of said tubular sleeve.

8. A pipetting device as claimed in claim 6, wherein the major portion of said tube located outside said one end of said tubular sleeve is wound onto a store roll.

9. A pipetting device as claimed in claim 6, comprising means for cutting said tube outside of said opposite end of said tubular sleeve.

10. A pipetting device as claimed in claim 9, wherein said tube consists of a ductile material and means are provided for stretching a portion of said tube to a smaller diameter and a smaller wall thickness, said cutting means being provided to cut said tube at said stretched portion thereof.

11. A pipetting device as claimed in claim 10, comprising means for heating said portion of said tube.

12. A pipetting device as claimed in claim 6, wherein said tube is sterile and provided with an outer protective sheath and means are provided at said opposite end of said tubular sleeve for removing said protective sheath from said tube at the rate said tube is transported by said feeding means.

13. A pipetting device as claimed in claim 2, comprising a control unit for controlling said means for transferring liquids selectively to and from said liquid-filled chamber and said means for closing said tube in accordance with a control program including following successive steps:
(a) activating said closing means to close said tube, and transferring such a liquid volume to said chamber that said elastic wall surrounding said tube is caused to compress the tube;
(b) withdrawing a predetermined variable liquid volume from said chamber;
(c) transferring a liquid volume to said chamber larger than the liquid volume withdrawn from the chamber in step (b), whereby said tube is compressed to a larger extent than in step (a);
(d) withdrawing such a liquid volume from said chamber that substantially the same total liquid volume in the chamber is obtained as after step (a).

14. A pipetting device as claimed in claim 13 further comprising means for feeding said tube through said tubular sleeve toward the opposite end of said tubular sleeve and means for cutting said tube outside of said opposite end of said tubular sleeve, and wherein said control unit controls also said feeding means and said cutting means and said control program includes following additional steps after step (d):
(e) withdrawing such a liquid volume from said liquid-filled chamber that said tube is no longer held by said elastic wall surrounding said tube;
(f) opening said closing means for said tube and activating said feeding means to feed a predetermined length of said tube through said tubular passage in said liquid-filled chamber;
(g) activating said cutting means to cut said tube; and
(h) activating said feeding means once more to feed an additional predetermined length of said tube through said liquid chamber.

References Cited

UNITED STATES PATENTS

| | | | |
|---|---|---|---|
| 1,092,384 | 4/1914 | Nickels | 23—292 X |
| 3,273,402 | 9/1966 | Farr | 23—259 X |
| 3,297,558 | 1/1967 | Hillquist | 23—259 X |

MORRIS O. WOLK, Primary Examiner

R. E. SERWIN, Assistant Examiner

U.S. Cl. X.R.

23—292; 73—425.4 P, 425.6